(12) United States Patent
Farrand et al.

(10) Patent No.: US 8,906,998 B2
(45) Date of Patent: *Dec. 9, 2014

(54) WHITE REFLECTIVE POLYMER PARTICLES

(75) Inventors: Louise Diane Farrand, Dorset (GB); Mark John Goulding, Ringwood (GB); Roger Kemp, Winchester (GB); Jonathan Henry Wilson, Southampton (GB)

(73) Assignee: Merck Patent GmbH (DE)

( * ) Notice: Subject to any disclaimer, the term of this patent is extended or adjusted under 35 U.S.C. 154(b) by 0 days.

This patent is subject to a terminal disclaimer.

(21) Appl. No.: 13/702,185

(22) PCT Filed: May 30, 2011

(86) PCT No.: PCT/EP2011/002667
§ 371 (c)(1),
(2), (4) Date: Dec. 5, 2012

(87) PCT Pub. No.: WO2011/154104
PCT Pub. Date: Dec. 15, 2011

(65) Prior Publication Data
US 2013/0078559 A1    Mar. 28, 2013

(30) Foreign Application Priority Data
Jun. 7, 2010 (EP) .................................. 10005845

(51) Int. Cl.
| C08K 3/18 | (2006.01) |
| G03G 17/04 | (2006.01) |
| G02F 1/167 | (2006.01) |
| B82Y 30/00 | (2011.01) |

(52) U.S. Cl.
CPC ............... *G03G 17/04* (2013.01); *G02F 1/167* (2013.01); *G02F 2001/1678* (2013.01); *B82Y 30/00* (2013.01); *Y10S 977/773* (2013.01)
USPC ............................. 524/431; 430/32; 977/773

(58) Field of Classification Search
CPC ..... G03G 17/04; Y10S 977/773; B82Y 30/00
USPC ........................................... 524/431; 430/32
See application file for complete search history.

(56) References Cited

U.S. PATENT DOCUMENTS

| 5,380,362 A | 1/1995 | Schubert |
| 5,403,518 A | 4/1995 | Schubert |
| 5,582,700 A | 12/1996 | Bryning et al. |
| 5,783,614 A | 7/1998 | Chen et al. |
| 6,194,488 B1 | 2/2001 | Chen et al. |
| 6,956,690 B2 | 10/2005 | Yu et al. |
| 7,038,655 B2 | 5/2006 | Herb et al. |
| 7,052,766 B2 | 5/2006 | Zang et al. |
| 7,110,162 B2 | 9/2006 | Wu et al. |
| 7,170,670 B2 | 1/2007 | Webber |
| 7,226,550 B2 | 6/2007 | Hou et al. |
| 7,236,290 B1 | 6/2007 | Zhang et al. |
| 7,247,379 B2 | 7/2007 | Pullen et al. |
| 7,277,218 B2 | 10/2007 | Hwang et al. |
| 7,304,634 B2 | 12/2007 | Albert et al. |
| 2007/0128352 A1 | 6/2007 | Honeyman et al. |
| 2007/0268244 A1 | 11/2007 | Chopra et al. |
| 2010/0120948 A1* | 5/2010 | Gane et al. ................ 524/5 |

FOREIGN PATENT DOCUMENTS

| EP | 1491941 A2 | 6/2004 |
| GB | 2438436 A | 11/2007 |
| WO | WO-99/10767 A1 | 3/1999 |
| WO | WO-2005017046 A2 | 2/2005 |
| WO | WO-2009100803 A2 | 8/2009 |
| WO | PCT/EP2010/000549 | 8/2010 |
| WO | PCT/EP2010/000550 | 8/2010 |
| WO | PCT/EP2010/000552 | 8/2010 |
| WO | PCT/EP2010000551 | 8/2010 |
| WO | WO-2010089057 A2 | 8/2010 |
| WO | WO-2010089058 A1 | 8/2010 |
| WO | WO-2010089059 A1 | 8/2010 |
| WO | WO-2010089060 A2 | 8/2010 |

OTHER PUBLICATIONS

Bunohara et al., The Imaging Society of Japan, 46(4), 247-253, 2007.*
Sunohara, Seiji, et al., "Investigation of Color Electrophorectic Display Utilizing Electrophoretic Colored Particles", The Imaging Society of Japan, vol. 46, No. 4, (2007), pp. 247-253.
Sunohara, Seiji, et al., "Preparation of Poly-Vinyl Pyrrolidone Fine Particles by Inverse Emulsification-Evaporation Process in Solvent", Kobunshi Ronbunshu, vol. 62, No. 7, (2005), pp. 310-315.
Guthrie, J.T., "Polymeric Colorants", Rev. Prog. Coloration, vol. 20, (1990), pp. 40-52.
International Search Report for PCT/EP2011/002667 mailed Aug. 23, 2011.
International Search Report of PCT/EP2011/002666.
U.S. Appl. No. 13/702,167, filed Dec. 5, 2012, Merck Patent GmbH.

\* cited by examiner

*Primary Examiner* — Hui Chin
(74) *Attorney, Agent, or Firm* — Drinker Biddle & Reath LLP

(57) ABSTRACT

This invention relates to white reflective polymer particles prepared by a reverse emulsion solvent removal process, electrophoretic fluids comprising such particles, and electrophoretic display devices comprising such fluids.

20 Claims, No Drawings

WHITE REFLECTIVE POLYMER PARTICLES

CROSS-REFERENCE TO RELATED APPLICATIONS

This application is a national stage application (under 35 U.S.C. §371) of PCT/EP2011/002667, filed May 30, 2011, which claims benefit of European application 10005845.2, filed Jun. 7, 2010.

This invention relates to white reflective polymer particles prepared by a reverse emulsion solvent removal process, electrophoretic fluids comprising such particles, and electrophoretic display devices comprising such fluids.

In recent years a need has developed for low power, low cost and light weight display devices. EPDs (Electrophoretic Displays) can fulfill this requirement. One use of EPDs is for electronic paper. It is imperative that once an image is displayed, the image can be retained for a long period of time without further voltage being applied. Hence, this fulfills the requirements of low power use, and means an image can be visible until another image is required.

An EPD generally comprises charged electrophoretic particles dispersed in a fluid and constrained between two substrates, each comprising one or more electrodes. The space between the electrodes is filled with a dispersion medium which is colourless or a different colour to the colour of the particles. If a voltage is applied between the electrodes, charged particles move to the electrode of opposite polarity. The particles can cover the observer's side electrode, so that a colour identical to the colour of the particles is displayed when an image is observed from the observer's side. Any image can be observed using a multiplicity of pixels.

Available technologies of EPDs include electronic paper, commercially used in electronic books. This application uses black and white or light colour. The use of different coloured particles in a single pixel has been exemplified in recent patent literature (U.S. Pat. No. 7,304,634, GB 2 438 436, US 2007/0268244). Particles comprising a polymer and an organic pigment are described in Nippon Gazo Gakkaishi 46(4) 2007, 247-253 and in Kobunshi Ronbunshu, 62(7), 310-315 (July 2005).

Usually electrophoretic fluids comprise a charged inorganic nanoparticle such as titania, alumina or barium sulphate, coated with a surface layer to promote good dispersibility in dielectric media and a dielectric fluid media.

There continues to be a demand for improved electrophoretic fluids and a simple preparation of white reflective particles which can be easily dispersed in non-polar media. An improved route to provide white reflective particles and new electrophoretic fluids has now been found.

The present invention relates to a process for the preparation of white reflective polymer particles comprising the steps of a) forming a reverse emulsion comprising at least one polymer, at least one white reflective particle, at least one polar solvent, at least one non-polar solvent, and at least one surfactant and b) removing the polar solvent or polar solvents by evaporative methods. The subject matter of this invention relates specifically to white reflective polymer particles prepared by such process, and to electrophoretic fluids and displays comprising such white reflective polymer particles.

Throughout the specification, "reverse emulsion" means that a non-polar solvent (preferably dodecane, or comparable aliphatic hydrocarbons)) forms the continuous phase and a polar solvent (preferably water) forms the discontinuous phase (internal phase). Furthermore, the present process is called either "evaporative precipitation" or "reverse emulsion solvent removal" (RESR) due to the steps involved in forming a reverse emulsion and then removing the solvent from the internal phase by evaporative methods to form a solid particle.

The new process provides a simple cost effective way to prepare white reflective polymer particles suitable for EPD and it is possible to manipulate charge, size, polydispersity, steric stability etc. separately in order to produce particles with all the desired features for EPD. Furthermore, the use of largely non-hazardous materials is preferred. Advantageously, commercially available materials can be used. The process developed is a simple method using as few as possible physical processes to yield the final electrophoretic fluid by forming a reverse emulsion and evaporating the internal phase solvent yielding a dispersion of solid particles.

A main advantage of the present process is that the particles are formed directly in a solvent which is highly suitable for an EPD fluid. Therefore, no unwanted solvent contamination occurs in the final formulation. Also transfer to other solvents suitable for EPD is easily possible if required. The present process provides white reflective polymer particles with an average density lower than that of the starting particles. Titanium dioxide has a density of over 4 depending on the exact grade and crystal form used, and this process provides a composite white reflective polymer particle with lower density than that of the starting titanium dioxide.

In addition, the particles may have the following properties: a homogeneous crosslinked network structure for solvent resistance, a non-swelling nature when dispersed in EPD solvent media, impact strength, hardness, dispersibility in a non-polar continuous phase that is the most used media for EPD, high electrophoretic mobility in dielectric media, excellent switching behaviour, faster response times at comparable voltages. Additionally the low solubility of the materials in the continuous phase also reduces the tendency of the particles to undergo Ostwald ripening processes.

In this new process to prepare white reflective polymer particles, an inorganic material (white reflective particle) of sufficiently high refractive index and white reflectivity is incorporated into an organic polymer based particle to yield a hybrid polymeric particle which exhibits good white reflective properties. Preferably, white reflective particles are used having a refractive index of ≥1.8, especially ≥2.0, are used. Especially titanium dioxide, zinc oxide, alumina, barium sulphate and/or tin dioxide, especially titanium dioxide and/or zinc oxide, can be used, preferably titanium dioxide or zinc oxide. Examples are TiPure R900 (titanium dioxide, Du Pont), TiOxide TR-81 (titanium dioxide, Huntsman), and Zinvisible (zinc oxide, Horsehead Corporation).

Preferred particle sizes for the white reflective particles are those which provide the optimum scattering intensity for the given white reflective particles. This varies depending on white reflective particles types, but is preferably around 100-1000 nm for titanium dioxide or more preferably 100-500 nm.

The charge of white reflective polymer particles can be easily controlled by using uncharged or charged materials (positive or negative), e.g. using a polymer which-has $SO_3^-$ and $Na^+$ groups available to provide charge into a particle. Alternatively, non-charged polymers may be used and the particles can be charged by using charged surfactants at the formulation stage.

The new particles can be prepared from many polymer types. Preferably, the polymer is produced from a monomer which is insoluble in non-polar solvents such as dodecane or the monomer is soluble but the polymer insoluble in non-polar solvents such as dodecane. Polymers which are particularly suitable are those which are highly hydrophilic or are charged to render themselves hydrophilic, especially preferred are for example poly(vinyl pyrrolidone), poly(acrylamide), poly(acrylic acid) and poly(methacrylic acid).

Further suitable and commercially available polymers are: Poly(2-acrylamido-2-methyl-1-propanesulfonic acid), Poly(2-acrylamido-2-methyl-1-propanesulfonic acid-co-acrylonitrile) acrylonitrile, Poly(N-isopropylacrylamide), Poly(acrylamide-co-acrylic acid), Poly(acrylamide-co-acrylic acid) partial sodium salt, Poly(acrylamide-co-acrylic acid) potassium salt, Polyacrylamide, Poly(acrylic acid sodium salt), Poly(acrylic acid), Poly(acrylic acid) partial potassium salt, Poly(acrylic acid) partial sodium salt, Poly(acrylic acid), partial sodium salt-graft-poly(ethylene oxide), Poly(acrylic acid-co-maleic acid) sodium salt, Poly(ethylene-a/t-maleic anhydride), Poly(isobutylene-co-maleic acid) sodium salt, Poly(methyl vinyl ether-a/t-maleic acid monobutyl ester), Poly(methyl vinyl ether-a/t-maleic acid), Poly(methyl vinyl ether-alt-maleic anhydride), Poly(styrene-a/t-maleic acid), Poly(1-vinylpyrrolidone-co-2-dimethylaminoethyl methacrylate), Poly(2-dimethylamino)ethyl methacrylate) methyl chloride quaternary salt, Poly(2-ethylacrylic acid), Poly(2-hydroxyethyl methacrylate), Poly(2-hydroxypropyl methacrylate), Poly(2-propylacrylic acid), Poly(methacrylic acid, sodium salt), Poly[(2-ethyldimethylammonioethyl methacrylate ethyl sulfate)-co-(1-vinylpyrrolidone)], Poly[ethyl acrylate-co-methacrylic acid-co-3-(1-isocyanato-1-methyl-ethyl)-α-methylstyrene], adduct with ethoxylated nonylphenol, Cucurbit[5]uril, Cucurbit[7]uril, Cucurbit[8]uril, Ethylenimine, oligomer, Poly(2-ethyl-2-oxazoline), Poly(2-isopropenyl-2-oxazoline-co-methyl methacrylate), Poly(acrylamide-co-diallyldimethylammonium chloride), Poly(allylamine hydrochloride), Poly(allylamine), Poly(diallyldimethylammonium chloride), Poly(dimethylamine-co-epichlorohydrin-co-ethylenediamine), Poly(ethyleneimine), Poly[bis(2-chloroethyl) ether-a/t-1,3-bis[3-(dimethylamino)propyl]urea] quaternized, Polyethylenimine, 80% ethoxylated, Polyethylenimine, branched, 2-Dodecenylsuccinic polyglyceride, Glycerol propoxylate average, Poly(methyl vinyl ether), Polyepoxysuccinic acid, Poly(4-styrenesulfonic acid) ammonium salt, Poly(4-styrenesulfonic acid) lithium salt, Poly(4-styrenesulfonic acid), Poly(4-styrenesulfonic acid-co-maleic acid) sodium salt, Poly(anetholesulfonic acid, sodium salt), Poly(sodium 4-styrenesulfonate), Poly(vinyl acetate-co-crotonic acid), Poly(vinyl sulfate) potassium salt, Poly(vinylphosphonic acid), Poly(vinylsulfonic acid, sodium salt), Mowiol, Poly(vinyl alcohol), Poly(vinyl alcohol-co-ethylene).

Most preferred are poly(acrylamide), poly(1-vinylpyrrolidone-co-2-dimethylaminoethyl methacrylate), and poly(acrylic acid) and poly(methacrylic acid) or their corresponding alkali salts.

Charging the polymer can also be facilitated by using for polymer preparation an initiator which is charged leaving that charge residing as an end-group on the polymer. Such examples are 2,2'-azobis(2-methylpropionamidine)dihydrochloride (V-50) (Wako Chemicals), potassium peroxodisulfate (KPS), ammonium peroxodisulfate (APS), sodium peroxodisulfate (SPS), 2,2'-azobiscyanovaleric acid (ACVA) (Wako Chemicals), 2,2'-azobis[2-(2-imidazolin-2-yl)propane]dihydrochloride (VA044) (Wako Chemicals).

However, charging does not have to come from the initiator fragment so initiators which can also be used are those such as 2,2'-azobis(isobutyronitrile) (AIBN) (Wako Chemicals), 2,2'-azobis(2-methylbutyronitrile) (Vazo 67) (Wako Chemicals) and benzoyl peroxide.

The weight ratio of white reflective particle to polymer in the final white reflective polymer particles may be in a range of 4:1 to 1:4, preferably 4:1 to 1:1. Especially for highly scattering white reflective polymer particles the preferred weight ratio of white reflective particle to polymer in the composite white reflective polymer particle is >1.2, preferably >1.5.

Further essential components of the present process are surfactants, generally having a hydrophilic head group and a hydrophobic tail. Preferred surfactants are those with a hydrophilic-lipophilic balance (HLB, as described in "Introduction to Surface and Colloid Chemistry" (Ed. DJ Shaw, Pub. Butterworth Heinemann)) less than 10, preferably between 2 and 8 and more preferably 3 and 6. HLB of a surfactant is a measure of the degree to which the surfactant is hydrophilic or lipophilic, determined by calculating values for the different regions of the molecule. The head group may be a salt to allow charging or can also consist of an amine or acid moiety which can also, but does not have to, charge the particle.

The role of the surfactant is to stabilize the reverse emulsion when it is formed and then to stabilize the solid particles after solvent removal. The surfactant can also be used to charge the particles, allowing them to switch electrophoretically. This may be achieved by using a blend of surfactants or one single surfactant.

Preferable surfactants additives have some form of block, branched, graft or comb-like structure to maximize physical or chemical adsorption onto the surface of the particles. Long or branched hydrophobic tails are preferable to maximize the steric stabilization of the surfactant. Especially suitable are succinimide based surfactants, and alkyl sulfosuccinates.

Typical surfactants (either by steric stabilisation or by use as a charging agent) are known to experts in the field and include (but are not limited to) the Brij, Span and Tween series of surfactants (Aldrich), Infineum surfactants (Infineum), the Solsperse, Ircosperse and Colorburst series (Lubrizol), the OLOA charging agents (Chevron Chemicals) and Aerosol-OT (A-OT) (Aldrich). Preferable surfactant additives in this work are Solsperse range and A-OT, and even more preferably Solsperse 17,000 and A-OT.

Solvents for the two phases of the reverse emulsion are preferably chosen to be as immiscible as possible whilst being good solvents for the components.

The continuous phase (preferably dodecane) is required to be a good solvent for the surfactants being used and the discontinuous phase must be a good solvent for the pigment and polymer matrix material used (preferably water).

The continuous phase solvent can be chosen primarily on the basis of dielectric constant, refractive index, density and viscosity. A preferred solvent choice would display a low dielectric constant (<10, more preferably <5), high volume resistivity (about $10^{15}$ ohm-cm), a low viscosity (less than 5 cst), low water solubility, a high boiling point (>80° C.) and a refractive index and density similar to that of the polymer used in step a).

Adjustment of these variables can be useful in order to change the behaviour of the final application. Preferred solvents are non-polar hydrocarbon solvents such as the Isopar series (Exxon-Mobil), Norpar, Shell-Sol (Shell), Sol-Trol (Shell), naphtha, and other petroleum solvents, as well as long chain alkanes such as dodecane, tetradecane, decane and nonane). These tend to be low dielectric, low viscosity, and low density solvents. Preferably dodecane, tetradecane, decane, nonane, and mixtures thereof are used. A density matched particle/solvent mixture will yield much improved settling/sedimentation characteristics and thus is desirable. For this reason, often it can be useful to add a halogenated solvent to enable density matching. Typical examples of such solvents are the Halocarbon oil series (Halocarbon products), or tetrachlorethylene, carbon tetrachloride, 1,2,4-trichlorobenzene and similar solvents. The negative aspect of many of these solvents is toxicity and environmental friendliness, and so in some cases it can also be beneficial to add additives to enhance stability to sedimentation rather than using such solvents. Especially preferred is dodecane.

The discontinuous phase solvent is chosen primarily on the solubility of the polymer matrix components, its boiling point relative to that of the continuous phase and its solubility in the continuous phase. Those solvents particularly suitable are water, low molecular weight alcohols and some of the more hydrophilic solvents from ketones, aldehydes, ethers and esters. Further suitable solvents could also include highly polar solvents such as acetonitrile, DMSO (dimethyl sulfoxide) and DMF (dimethylformamide).

Preferably water, low molecular weight alcohols, acetonitrile, DMSO, DMF or mixtures thereof, preferably water and/or ethanol, are used. The most preferred solvent is water.

The solvent selected must have a boiling point lower than that of the continuous phase to allow its removal and it is also important to consider any azeotropes which may form restricting removal of the discontinuous phase solvent. Solvents which are particularly suitable for these 2 emulsion phases are a dodecane continuous phase and a water or ethanol discontinuous phase.

The present process comprises the steps of a) forming a reverse emulsion comprising at least one polymer, at least one white reflective particle, at least one polar solvent, at least one non-polar solvent, and at least one optionally charged surfactant, b) removing the polar solvent or polar solvents by evaporative methods and c) optionally removing the non-polar solvent or non-polar solvents. It is especially advantageous that step c) can be omitted if the continuous phase consists of the solvent intended for use in the electrophoretic solvent.

The reverse emulsion of step a) is prepared by a1) forming a polar phase by mixing at least one polymer, at least one white reflective particle, and at least one polar solvent, a2) forming a non-polar phase by mixing at least one non-polar solvent, and at least one surfactant, a3) combining the polar phase and the non-polar phase, and a4) homogenising the combined phases to form the reverse emulsion.

It is most preferred that in step a1) the following components are used 1) titanium dioxide or zinc oxide, 2) a polymer selected from poly(1-vinylpyrrolidone-co-2-dimethylaminoethyl methacrylate), poly(acrylamide), and poly(acrylic acid) and poly(methacrylic acid) or their corresponding alkali salts, and 3) water, and that a surfactant and dodecane are used in step a2).

The reverse emulsion is preferably formed using some form of shear. This shear may be in the form of high shear homogenisation by for example a
Silverson homogeniser or sonication by for example a Branson Sonifer. It is often advantageous to form a reverse pre-emulsion using low shear and then higher shear to form the desired particle size. The shear is preferably applied once the non-polar continuous phase and polar discontinuous phase have been formed, separately mixed until homogeneous and then combined to form a 2-phase system. Additionally, shear may be advantageous to form the aqueous phase to help dispersion of the white reflective particle which can be done using high shear homogenisation or sonication.

In another preferred variant of the invention, the particles can be cross-linked in this method by inclusion of reactive side groups in the components which comprise the particle. Cross-linking can be facilitated for example by post particle formation polymerisation initiated by UV or heat, or by reaction of side groups driven by removal of the polar solvent.

These reactions preferably need no further synthetic step than those already used to remove the solvent and form particles, being preferably driven by heating, UV or removal of water. These reactions can include for example polymerisation of pendant double bonds by inclusion of a thermal or UV initiator, or cross condensation or side groups, driven by removal of water.

Particles of the invention are primarily designed for use in electrophoretic displays, especially for use in mono, bi or polychromal electrophoretic devices. A typical electrophoretic display comprises an electrophoretic fluid comprising the particles dispersed in a low polar or non-polar solvent along with additives to improve electrophoretic properties, such as stability and charge. Examples of such electrophoretic fluids are well described in the literature, for example U.S. Pat. No. 7,247,379; WO 99/10767; US 2007/0128352; U.S. Pat. Nos. 7,236,290; 7,170,670; 7,038,655; 7,277,218; 7,226,550; 7,110,162; 6,956,690; 7,052,766; 6,194,488; 5,783,614; 5,403,518; 5,380,362.

Preferably the present white reflective polymer particles may be used in combination with coloured polymer particles. Preferably the coloured polymer particles comprise a polymerised or co-polymerised dye. Especially coloured copolymers particles comprising monomer units of at least one monomer, of at least one polymerisable dye, optionally of at least one charged co-monomer, and optionally of at least one crosslinking co-monomer are preferred. The polymerisable dye comprises preferably a chromophore, preferably an azo group, anthraquinone group or phthalocyanine group, one or more polymerisable groups, and optional linker groups. To enhance the surface stabilisation or steric repulsions of the coloured polymeric particles in a non-polar continuous phase, a steric stabiliser is preferably incorporated into the coloured polymer particles.

Further suitable coloured polymer particles are prepared by colouring polymer particles with a dye as described in WO 2009/100803 or with a pre-polymerised dye as described in WO 2010/089058. Also suitable are coloured polymer particles prepared by colouring polymer particles with a polymerisable dye and subsequent polymerisation of the dye as described in WO 2010/089059.

Suitable coloured polymer particles are preferably prepared by emulsion polymerisation, especially by an emulsifier-free batch emulsion polymerisation process, as described in WO 2010/089060. A preferred emulsion polymerisation composition comprises a polymerisable dye, methyl methacrylate and ethylene glycol dimethacrylate as a cross-linker and 2-methacryloxy ethyl trimethyl ammonium chloride (MOTAC) as reactive charged monomer.

Suitable coloured polymer particles are very preferably prepared by copolymerisation in a non-aqueous, non-polar solvent, especially by copolymerisation of a polymerisable dye, methyl methacrylate (MMA), methacrylic acid, stabiliser, and initiator, as described in WO 2010/089057.

Especially coloured polymer particles derived from polymerisable dyes described in WO 2010/089057, WO 2010/089059, and WO 2010/089060, preferably WO 2010/089057, are suitable for combinations with white reflective particles of the present invention.

Prior to combination of these coloured polymer particles with the present white reflective polymer particles, the coloured polymer particles may undergo treatment by a RESR process comprising the steps of a) forming a reverse emulsion comprising at least one coloured polymer particle, at least one polar solvent, at least one non-polar solvent, and at least one optionally charged surfactant, b) removing the polar solvent or polar solvents by evaporative methods c) optionally removing the non-polar solvent or non-polar solvents.

It is also possible to combine the present white reflective polymer particles with coloured polymer particles prepared by a RESR process comprising the steps of a) forming a reverse emulsion comprising optionally at least one polymer, at least one, optionally pre-polymerised, dye, at least one polar solvent, at least one non-polar solvent, and at least one optionally charged surfactant, b) removing the polar solvent or polar solvents by evaporative methods c) optionally removing the non-polar solvent or non-polar solvents. The dye may be an organic or an organo-metallic dye and it may be polymerisable or pre-polymerised.

White reflective polymer particles and coloured polymer particles are preferably spherical particles with a size (diameter) in the range of 50-1000 nm and preferably with a monodisperse size distribution. Preferred particle sizes are 50-600 nm, preferably 50-560 nm, especially 50-500 nm, even more preferred 100-400 nm. Especially preferred are particles having a particle size of 150-400 nm, especially 150-350 nm. Particle sizes are determined by photon correlation spectroscopy of non-aqueous particle dispersions by a common apparatus such as a Malvern NanoZS particle analyser, or by electron microscopy and image analysis.

The size of polymer particles in electrophoretic fluids may be different from sizes measured in aqueous dispersions because of the influence of solvents and/or surfactants. In electrophoretic fluids, the polymer particles of the invention preferably have a particle size of 100-800 nm, especially 100-700 nm, preferably 150-700 nm are preferred. Especially preferred are polymer particles having a particle size of 150-600 nm.

Typical additives to improve the stability of the fluid (either by steric stabilisation or by use as a charging agent) are known to experts in the field and include (but are not limited to) the Brij, Span and Tween series of surfactants (Aldrich), Infineum surfactants (Infineum), the Solsperse, Ircosperse and Colorburst series (Lubrizol), the OLOA charging agents (Chevron Chemicals) and Aerosol-OT (Aldrich).

Any other additives to improve the electrophoretic properties can be incorporated provided they are soluble in the formulation medium, in particular thickening agents or polymer additives designed to minimise settling effects.

The dispersion solvent can be chosen primarily on the basis of dielectric constant, refractive index, density and viscosity. A preferred solvent choice would display a low dielectric constant (<10, more preferably <5), high volume resistivity (about $10^{15}$ ohm-cm), a low viscosity (less than 5 cst), low water solubility, a high boiling point (>80° C.) and a refractive index and density similar to that of the particles. Adjustment of these variables can be useful in order to change the behavior of the final application. For example, in a slow-switching application such as poster displays or shelf labels, it can be advantageous to have an increased viscosity to improve the lifetime of the image, at the cost of slower switching speeds. However in an application requiring fast switching, for example e-books and displays, a lower viscosity will enable faster switching, at the cost of the lifetime in which the image remains stable (and hence an increase in power consumption as the display will need more frequent addressing). The preferred solvents are often non-polar hydrocarbon solvents such as the Isopar series (Exxon-Mobil), Norpar, Shell-Sol (Shell), Sol-Trol (Shell), naphtha, and other petroleum solvents, as well as long chain alkanes such as dodecane, tetradecane, decane and nonane). These tend to be low dielectric, low viscosity, and low density solvents. A density matched particle/solvent mixture will yield much improved settling/sedimentation characteristics and thus is desirable. For this reason, often it can be useful to add a halogenated solvent to enable density matching. Typical examples of such solvents are the Halocarbon oil series (Halocarbon products), or tetrachlorethylene, carbon tetrachloride, 1,2,4-trichlorobenzene and similar solvents. The negative aspect of many of these solvents is toxicity and environmental friendliness, and so in some cases it can also be beneficial to add additives to enhance stability to sedimentation rather than using such solvents.

The preferred additives and solvents used in the formulation of the particles of the invention are OLOA11000 (Chevron Chemicals), Ircosperse 2153 (Lubrizol Ltd), Infineum E (Infineum) and dodecane (Sigma Aldrich).

The solvents and additives used to disperse the particles are not limited to those used within the examples of this invention and many other solvents and/or dispersants can be used. Lists of suitable solvents and dispersants for electrophoretic displays can be found in existing literature, in particular WO 99/10767 and WO 2005/017046. The Electrophoretic fluid is then incorporated into an Electrophoretic display element by a variety of pixel architectures, such as can be found in C. M. Lampert, Displays; 2004, 25(5) published by Elsevier B.V., Amsterdam.

The Electrophoretic fluid may be applied by several techniques such as inkjet printing, slot die spraying, nozzle spraying, and flexographic printing, or any other contact or contactless printing or deposition technique.

Electrophoretic displays comprise typically, the electrophoretic display media in close combination with a monolithic or patterned backplane electrode structure, suitable for switching the pixels or patterned elements between the black and white optical states or their intermediate greyscale states.

The white reflective polymer particles according to the present invention are suitable for all known electrophoretic media and electrophoretic displays, e.g. flexible displays, one particle systems, two particle systems, dyed fluids, systems comprising microcapsules, microcup systems, air gap systems and others as described in C. M. Lampert, Displays; 2004, 25(5) published by Elsevier B.V., Amsterdam. Examples of flexible displays are dynamic keypads, e-paper watches, dynamic pricing and advertising, e-readers, rollable displays, smart card media, product packaging, mobile phones, lab tops, display card, digital signage.

The disclosures in the cited references are thus expressly also part of the disclosure content of the present application. The following examples explain the present invention in greater detail without restricting the scope of protection.

EXAMPLES

All solvents except water are purchased from VWR at the highest grade possible and are used without further purification. The water used is deionised. Poly(1-vinylpyrrolidone-co-dimethylaminoethyl methacrylate), poly(sodium acrylate) (Mw 15,000, 35% in water) and polyacrylamide (Mw 10,000, 50% in water) are purchased from Sigma-Aldrich and are used without further purification. Solsperse 17,000 is provided by Lubrizol and is used without further purification. TiPure R900 is purchased from Du Pont and is used without further purification. TiOxide TR-81 is purchased from Huntsman and is used without further purification. Zinvisible is purchased from Horsehead Corporation and is used without further purification.

The characterisation of the formulations was performed using a Malvern NanoZS particle analyser. This instrument measures the size of particles in dispersion and the zeta potential of an electrophoretic fluid. The Zeta potential (ZP) is derived from the real-time measurement of the electrophoretic mobility and thus is an indicator of the suitability of the fluid for use in electrophoretic applications.

Example 1

Preparation of a Dispersion of TiPure R900-Poly(Acrylamide) Nanoparticles

An aqueous phase is formed by combining water (17.6 g), TiPure R900 (1 g) and poly(acrylamide) (4.8 g). This dispersion is stirred until homogeneous and is then submitted to high shear homogenisation by a Branson Sonifer 450 using a horn probe at 40% strength for 5 minutes.

In a separate flask, an oil phase is formed by combining Solsperse 17000 (2.4 g) and dodecane (80 g). This solution is stirred until homogeneous. An IKA high shear homogeniser is submerged in the oil phase and stirring is started at 20,000 rpm.

The aqueous phase is then added dropwise to the oil phase over 1 minute, and stirring is maintained for 4 further minutes. The reverse pre-emulsion is then submitted to high shear homogenisation by a Branson Sonifier 450 using a horn probe at 40% strength for 5 minutes to form the final reverse emulsion. The reverse emulsion is then transferred to a Florentine flask and placed on a rotary evaporator to remove water from the discontinuous phase of the reverse emulsion.

On completion, the product is obtained as a suspension of white reflective particles of TiPure R900 in a matrix of poly (acrylamide), stabilised by Solsperse 17,000 and dispersed in dodecane.

Example 2

Preparation of a Dispersion of TiOxide TR-81-Poly(Acrylamide) Nanoparticles

An aqueous phase is formed by combining water (17.6 g), TiOxide TR-81 (1 g) and poly(acrylamide) (4.8 g). This dispersion is stirred until homogeneous and is then submitted to high shear homogenisation by a Branson Sonifer 450 using a horn probe at 40% strength for 5 minutes.

In a separate flask, an oil phase is formed by combining Solsperse 17000 (2.4 g) and dodecane (80 g). This solution is stirred until homogeneous. An IKA high shear homogeniser is submerged in the oil phase and stirring is started at 20,000 rpm.

The aqueous phase is then added dropwise to the oil phase over 1 minute, and stirring is maintained for 4 further minutes. The reverse pre-emulsion is then submitted to high shear homogenisation by a Branson Sonifier 450 using a horn probe at 40% strength for 5 minutes to form the final reverse emulsion. The reverse emulsion is then transferred to a Florentine flask and placed on a rotary evaporator to remove water from the discontinuous phase of the reverse emulsion.

On completion, the product is obtained as a suspension of white reflective particles of TiOxide TR-81 in a matrix of poly(acrylamide), stabilised by
Solsperse 17,000 and dispersed in dodecane.

Example 3

Preparation of a Dispersion of TiPure R900-Poly(Sodium Acrylate) Nanoparticles

An aqueous phase is formed by combining water (15.5 g), TiPure R900 (1.0 g) and poly(sodium acrylate) (6.9 g. This dispersion is stirred until homogeneous.

In a separate flask an oil phase is formed by combining Solsperse 17000 (2.4 g) and dodecane (80 g). This dispersion is stirred until homogeneous and is then submitted to high shear homogenisation by a Branson Sonifer 450 using a horn probe at 40% strength for 5 minutes. An IKA high shear homogeniser is submerged in the oil phase and stirring is started at 20,000 rpm.

The aqueous phase is added dropwise to the oil phase over 1 minute, and then stirring is maintained for 4 further minutes. The reverse pre-emulsion is then submitted to high shear homogenisation by a Branson Sonifier 450 using a horn probe at 40% strength for 5 minutes to form the final reverse emulsion. The reverse emulsion is then transferred to a Florentine flask and placed on a rotary evaporator to remove water from the discontinuous phase of the reverse emulsion.

On completion, the product is obtained as a suspension of white reflective particles of TiPure R900 in a matrix of poly (sodium acrylate), stabilised by Solsperse 17,000 and dispersed in dodecane.

Example 4

Preparation of a Dispersion of Zinvisible-Polyacrylamide Nanoparticles

An aqueous phase is formed by combining water (17.6 g), Zinvisible (1.0 g) and poly(acrylamide) (4.8 g). This dispersion is stirred until homogeneous and is then submitted to high shear homogenisation by a Branson Sonifer 450 using a horn probe at 40% strength for 5 minutes.

In a separate flask an oil phase is formed by combining Solsperse 17000 (2.4 g) and dodecane (80 g). This solution is stirred until homogeneous. An IKA high shear homogeniser is submerged in the oil phase and stirring is started at 20,000 rpm.

The aqueous phase is added dropwise to the oil phase over 1 minute, and then stirring is maintained for 4 further minutes. The reverse pre-emulsion is then submitted to high shear homogenisation by a Branson Sonifier 450 using a horn probe at 40% strength for 5 minutes to form the final reverse emulsion. The reverse emulsion is then transferred to a Florentine flask and placed on a rotary evaporator to remove water from the discontinuous phase of the reverse emulsion.

On completion, the product is obtained as a suspension of white reflective particles of Zinvisible in a matrix of poly (acrylamide), stabilised by Solsperse 17,000 and dispersed in dodecane.

Example 5

Preparation of a Dispersion of TiPure R900 Titanium Dioxide-Crosslinked Polyacrylic Acid Nanoparticles An aqueous phase is formed by combining water (20 g), TiPure R900 (2 g) and poly(acrylic acid) (5 g), 1-[3-(dimethylamino)propyl]-3-ethylcarbodiimide methiodide (1 g). This dispersion is stirred until homogeneous. In a separate flask an oil phase is formed by combining Solsperse 17000 (2.4 g) and dodecane (80 g). This solution is stirred until homogeneous. An IKA high shear homogeniser is submerged in the oil phase and stirring is started at 20,000 rpm. The aqueous phase is then added dropwise over 1 minute, and then stirring is maintained for 4 further minutes. After this time, stirring is maintained and 2,2'-(ethylenedioxy)bis(ethylamine) (0.25 g) is dripped into the solution. The reverse pre-emulsion is then submitted to high shear homogenisation by a Branson Sonifier 450 using a horn probe at 40% strength for 5 minutes to form the final reverse emulsion. The reverse emulsion is then transferred to a Florentine flask and placed on a rotary evaporator to remove water from the discontinuous phase of the reverse emulsion. On completion, the product is obtained as a suspension of highly reflective white particles of TiPure R900 in a matrix of crosslinked polyacrylic acid, stabilised by Solsperse 17,000 and dispersed in dodecane.

Example 6

Preparation of a Dispersion of TiPure R900 Titanium Dioxide-Crosslinked Polyvinyl Pyrrolidone-co-Dimethylaminoethyl Methacrylate Nanoparticles An aqueous phase is formed by combining water (20 g), TiPure R900 (2 g) and poly(1-vinylpyrrolidone-co-dimethylaminoethyl methacrylate) (5 g), vinylbenzylchloride (1 g) and AIBA (20mg). This dispersion is stirred until homogeneous. In a separate flask an oil phase is formed by combining Solsperse 17000 (2.4 g) and dodecane (80 g). This solution is stirred until homogeneous. An IKA high shear homogeniser is submerged in the oil phase and stirring is started at 20,000 rpm. The aqueous phase is then added dropwise over 1 minute, and then stirring is maintained for 4 further minutes. The reverse pre-emulsion is then submitted to high shear homogenisation by a Branson Sonifier 450 using a horn probe at 40% strength for 5 minutes to form the final reverse emulsion. The reverse emulsion is then transferred to a Florentine flask and placed on a rotary evaporator at 70C to remove water from the discontinuous phase of the reverse emulsion and initiate polymerisation. On completion, the product is obtained as a suspension of highly reflective white particles of TiPure R900 in a matrix of crosslinked polyvinylpyrrolidone-co-dimethylaminoethyl methacrylate quaternised with vinylbenzyl chloride, stabilised by Solsperse 17,000 and dispersed in dodecane.

Example 7

Electrophoretic Formulation Containing a Dispersion of TiPure R900-Poly(Acrylamide) Nanoparticles (Example 1)

The electrophoretic ink is prepared by vortex mixing 0.0400 g of TiPure R900-poly(acrylamide) nanoparticles from example 1, 0.0602 g of Infineum E (Infineum), and 1.902 g of dodecane(Sigma Aldrich). The dispersion is then roller mixed for 30 minutes.
Size (418.1 nm), Electrophoretic Mobility (0.06902 µmcm/Vs), ZP (+74.4 mV).

Example 8

Electrophoretic Formulation Containing a Dispersion of TiPure R900-Poly(Sodium Acrylate) Nanoparticles (Example 3)

The electrophoretic ink is prepared by vortex mixing 0.0400 g of TiPure R900-poly(sodium acrylate) nanoparticles (example 2), 0.0611 g of Infineum E (Infineum), and 1.900 g of dodecane (Sigma Aldrich). The dispersion is then roller mixed for 30 minutes.
Size (443.1 nm), Electrophoretic Mobility (0.09583 µmcm/Vs), ZP (+103.0 mV).

Example 9

Electrophoretic Formulation Containing a Dispersion of Zinvisible-Polyacrylamide Nanoparticles (Example 4)

The electrophoretic ink is prepared by vortex mixing 0.0400 g of TiPure R900-poly(sodium acrylate) nanoparticles (example 2), 0.0619 g of Infineum E (Infineum), and 1.904 g of dodecane (Sigma Aldrich). The dispersion is then roller mixed for 30 minutes.
Size (277.5 nm), Electrophoretic Mobility (0.04816 µmcm/Vs), ZP (+51.9 mV).

The invention claimed is:

1. A process for the preparation of white reflective polymer particles for use in electrophoretic devices, comprising the steps of
   a) forming a reverse emulsion comprising at least one polymer, at least one white reflective particle, at least one polar solvent, at least one non-polar solvent, and at least one optionally charged surfactant,
   b) removing the polar solvent or polar solvents by evaporative methods and
   c) not removing the non-polar solvent or non-polar solvents and wherein the white reflective particles comprise an inorganic material having a high refractive index ≥1.8.

2. The process according to claim 1, wherein the reverse emulsion of step a) is prepared by a1) forming a polar phase by mixing at least one polymer, at least one white reflective particle, and at least one polar solvent, a2) forming a non-polar phase by mixing at least one non-polar solvent, and at least one surfactant, a3) combining the polar phase and the non-polar phase, and a4) homogenising the combined phases to form the reverse emulsion.

3. The process according to claim 1, wherein the white reflective particles are titanium dioxide and/or zinc oxide.

4. The process according to claim 1, wherein the polymer of step a) is hydrophilic and/or charged.

5. The process according to claim 1, wherein the polar solvent used in step a) is water, a low molecular weight alcohol, acetonitrile, DMSO, DMF or mixtures thereof.

6. The process according to claim 1, wherein the polar solvent used in step a) is water and/or ethanol.

7. The process according to claim 1, wherein the non-polar solvent used in step a) is dodecane, tetradecane, decane, nonane, or mixtures thereof.

8. The process according to claim 1, wherein the non-polar solvent used in step a) has a refractive index and a density similar to that of the polymer used in step a).

9. The process according to claim 8, wherein the non-polar solvent is dodecane.

10. The process according to claim 1, wherein the white reflective polymer particles are cross-linked during or post particle formation according to steps a) to c).

11. White reflective polymer particles obtained by the process according to claim 1.

12. A process for the preparation of a mono, bi or polychromal electrophoretic device which comprises utilizing the white reflective polymer particles according to claim 11.

13. An electrophoretic fluid comprising the white reflective polymer particles according to claim 11 and optionally colored polymer particles comprising an optionally polymerized or co-polymerised dye.

14. The electrophoretic fluid according to claim 13, wherein the colored polymer particles are copolymers comprising monomer units of at least one monomer, of at least one polymerizable dye, optionally of at least one charged co-monomer, and optionally of at least one crosslinking co-monomer.

15. The electrophoretic fluid according to claim 13, wherein the polymerizable dye comprises a chromophore, wherein said chromophore is an azo group, anthraquinone group or phthalocyanine group.

16. The electrophoretic fluid according to claim 13, wherein the colored polymer particles are prepared by a RESR process comprising the steps of a) forming a reverse emulsion comprising at least one polymer, at least one dye, at least one polar solvent, at least one non-polar solvent, and at least one optionally charged surfactant, b) removing the polar solvent or polar solvents by evaporative methods, and c) not removing the non-polar solvent or non-polar solvents.

17. The electrophoretic fluid according to claim 13, wherein the white reflective polymer particles and the colored polymer particles have a diameter of 50-1000 nm.

18. An electrophoretic display device comprising the electrophoretic fluid according to claim 13.

19. The electrophoretic display device according to claim 16, wherein the electrophoretic fluid is applied by a technique selected from inkjet printing, slot die spraying, nozzle spraying, and flexographic printing, or any other contact or contactless printing or deposition technique.

20. The process according to claim 2, wherein the white reflective particles are titanium dioxide, zinc oxide, alumina, barium sulphate and/or tin dioxide.

* * * * *